US012154479B2

(12) United States Patent
Lachine

(10) Patent No.: US 12,154,479 B2
(45) Date of Patent: Nov. 26, 2024

(54) PIXEL ADAPTIVE BLUE LIGHT REDUCTION

(71) Applicant: ATI Technologies ULC, Markham (CA)

(72) Inventor: Vladimir Lachine, Markham (CA)

(73) Assignee: ATI Technologies ULC, Ontario (CA)

( * ) Notice: Subject to any disclaimer, the term of this patent is extended or adjusted under 35 U.S.C. 154(b) by 0 days.

(21) Appl. No.: 18/089,466

(22) Filed: Dec. 27, 2022

(65) Prior Publication Data

US 2024/0212569 A1 Jun. 27, 2024

(51) Int. Cl.
*G09G 3/20* (2006.01)

(52) U.S. Cl.
CPC ... *G09G 3/2096* (2013.01); *G09G 2320/0666* (2013.01); *G09G 2340/06* (2013.01)

(58) Field of Classification Search
CPC ......... G09G 3/2096; G09G 2320/0666; G09G 2340/06
See application file for complete search history.

(56) References Cited

U.S. PATENT DOCUMENTS 6,606,100 B1 * 8/2003 Lonoce .................. G09G 5/003 345/589
2008/0079749 A1 * 4/2008 Lin .......................... H04N 9/73 345/590
2016/0140913 A1 * 5/2016 Aragane .................. G09G 5/02 345/77
2017/0206641 A1 * 7/2017 Chang .................. H04N 1/6077
2021/0150998 A1 * 5/2021 Jo ........................ G09G 3/3648
2022/0104321 A1 * 3/2022 Sooch .................... H05B 45/20

OTHER PUBLICATIONS

Tao, J.-X., et al.; "Mitochondria as Potential Targets and Initiators of the Blue Light Hazard to the Retina"; Hindawi Oxidative Medicine and Cellular Longevity, vol. 2019, Article ID 6435364, Aug. 21, 2019, 21 pgs.
Zhao, Z.-C., et al.; "Research progress about the effect and prevention of blue light on eyes"; Int J Ophthalmol, vol. 11, No. 12; Dec. 18, 2018; 5 pgs.
Ouyang, X., et al.; "Mechanisms of blue light-induced eye hazard and protective measures: a review"; Biomediicine & Pharmacotheraphy 130 (2020) 110577; 2020, 8 pgs.

* cited by examiner

*Primary Examiner* — Towfiq Elahi
(74) *Attorney, Agent, or Firm* — Volpe Koenig

(57) ABSTRACT

A method of shifting a color temperature of an image on a display is provided which comprises, for each pixel of the image, converting red, green and blue (RGB) components of the pixel in a non-linear light space to hue, saturation, and value (HSV) components of the pixels in an HSV color space, calculating a color temperature shift for the pixel based on the HSV components of the pixel, converting the RGB components of the pixel in the non-linear light space to RGB components of the pixel in a linear light space, modifying the RGB components of the pixel in the linear light space and converting the modified RGB components of the pixel in the linear light space to modified RGB components of the pixel in the non-linear light space.

20 Claims, 7 Drawing Sheets

PIXEL ADAPTIVE BLUE LIGHT REDUCTION

BACKGROUND

Color temperature refers to the color of light that is emitted at a particular temperature. Color temperature, which is typically measured in kelvins (K) on a scale between 1,000 to 10,000, is a characteristic of visible light that has important applications in a variety of fields. The lower the color temperature of emitted light (e.g., light displayed on a monitor), the light is perceived as more yellow or red by the human eye. The higher the color temperature of the emitted light, the light is perceived as bluer by the human eye.

The color of objects in an image are typically displayed by combining different values of the red, green, and blue (RGB) primary color components of pixels to reproduce a broad array of colors. The color temperature of a white portion of an image, with RGB components, that is equal to 1 has a value of 6500K. Daylight color temperature varies between a range of 5500K-6500K. For example, monitors and televisions displays typically have a default color temperature of 6500K.

BRIEF DESCRIPTION OF THE DRAWINGS

A more detailed understanding can be had from the following description, given by way of example in conjunction with the accompanying drawings wherein.

DETAILED DESCRIPTION

Figure 1:
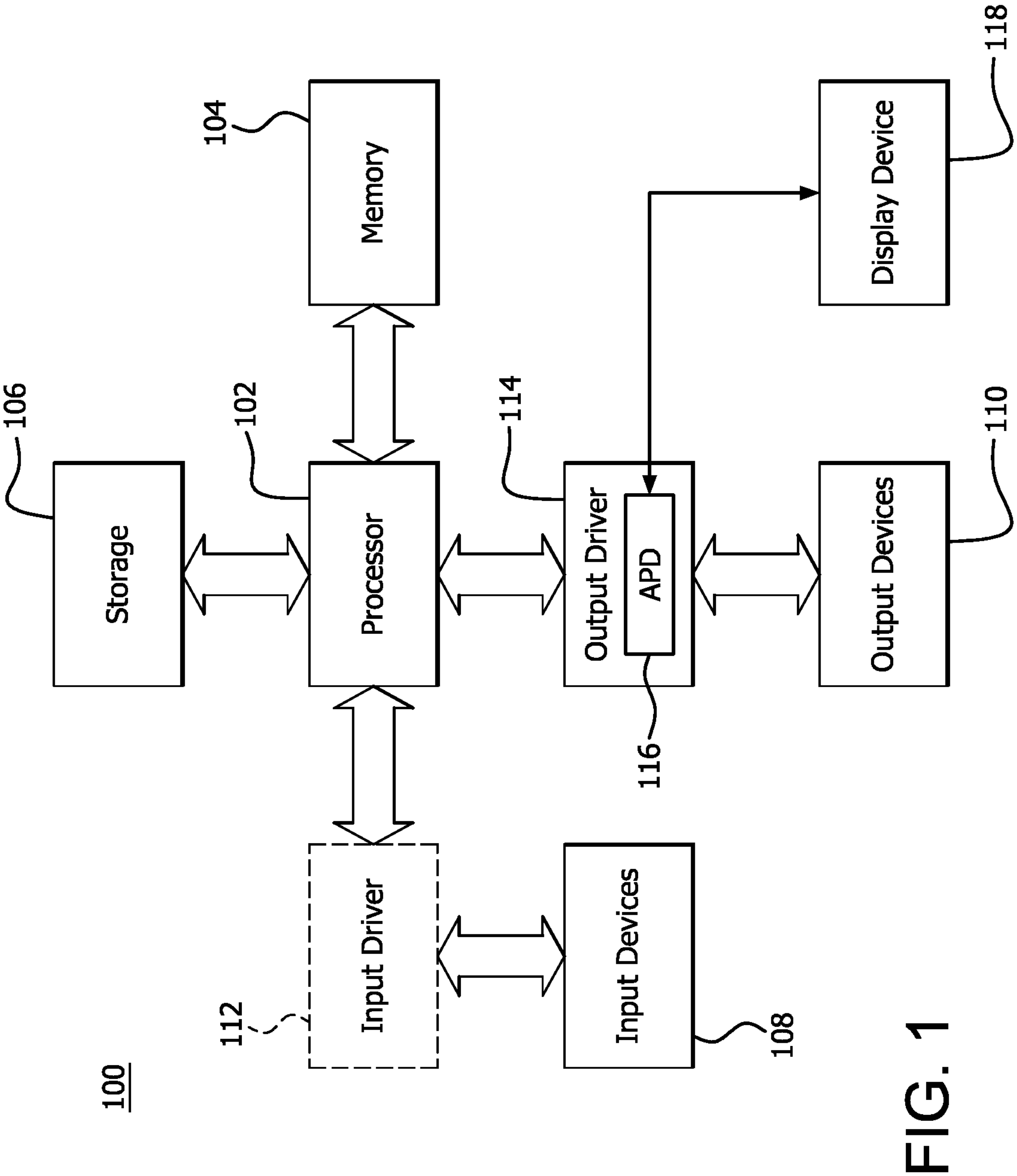
FIG. 1 is a block diagram of an example device in which one or more features of the present disclosure can be implemented.

As used herein, a program includes any sequence of instructions (e.g., an application, a module (e.g., a stitching module for stitching captured image data), a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of data (e.g., video data) includes for example, sampling data, encoding data, compressing data, reading and writing data, storing data, converting data to different formats (e.g., color spaces) and performing calculations and controlling one or more components to process data.

As used herein, a pixel is a portion of a video, image or computer graphic for display. A pixel portion includes any number of pixels, such as for example, a single pixel or multiple pixels (e.g., pixel block, macro block, a transform block, a row of pixels and a column of pixels).

Studies have shown a causal link between eye damage and emitted short-wave blue light with wavelengths between a range of 415 and 460 nanometers.

Conventional techniques which attempt to minimize or avoid eye damage by reducing harmful blue light emission include implementations in both hardware and software. For example, conventional hardware techniques place a film inside the optics of a display device to shift the frequency of the blue component emission peak (e.g., shifting the frequency to a red part of the spectrum of display emission) to a safer range and minimize the emitted short-wave blue light in the harmful range of 415 and 460 nanometers.

These conventional hardware techniques do not greatly affect the perception quality (i.e., perceived quality by a viewer) of displayed images because they typically do not affect the peak luminance and gamut of the display. However, reducing the harmful blue light emission via hardware requires physical redesign or modification of a display device.

Reducing the harmful blue light emission via software is much simpler than reducing harmful blue light emission via hardware because software techniques can be applied to any inherited display device without physical redesign or modification. Conventional software techniques, used for inherited displays without film, include modifying pixel components of displayed images by reducing the amplitudes of the blue component of pixels in an image. The pixel values are modified by shifting the color temperature toward a warmer (e.g., redder) appearance (e.g., via of 3×3 matrix of values or 3 one dimensional (1D) look up tables (LUTs)).

However, conventional software techniques for reducing blue light includes modifying all the pixels of an image, regardless of whether or not the blue component value is large enough to produce potential harm to human eyes, including pixels having a zero blue component value. Accordingly, these conventional software techniques typically affect the perception quality (i.e., perceived quality by a viewer) of displayed images because these techniques result in a noticeable reduction of the peak luminance and gamut volume of the display.

Features of the present disclosure reduce the harmful effects of blue light emission by shift a color temperature of an image on a per pixel basis. Features of the present disclosure reduce the harmful effects of blue light emission with minimal impact on the perception quality (i.e., minimal impact on the perceived quality by a viewer) of displayed images and without a physical redesign or modification of a display device.

Features of the present disclosure include implementation of a 3 dimensional look up table that represents a mapping of RGB component values of pixels to modified RGB pixel values for a set of anchor points. The mapped component values for the anchor points of the table are calculated off-line and the modified RGB pixel values components are generated on-line from the anchor points by tri-linear or tetrahedra interpolation.

A method of shifting a color temperature of an image on a display is provided which comprises, for each pixel of the image, converting red, green and blue (RGB) components of the pixel in a non-linear light space to hue, saturation, and value (HSV) components of the pixels in an HSV color space, calculating a color temperature shift for the pixel based on the HSV components of the pixel, converting the RGB components of the pixel in the non-linear light space to RGB components of the pixel in a linear light space, modifying the RGB components of the pixel in the linear light space and converting the modified RGB components of the pixel in the linear light space to modified RGB components of the pixel in the non-linear light space.

A processing device for shifting a color temperature of a displayed image is provided which comprises memory configured to store data and a processor configured to, for each pixel of the image, convert red, green and blue (RGB) components of the pixel in a non-linear light space to hue, saturation, and value (HSV) components of the pixels in an HSV color space, calculate a color temperature shift for the pixel based on the HSV components of the pixel, convert the RGB components of the pixel in the non-linear light space to RGB components of the pixel in a linear light space, modify the RGB components of the pixel in the linear light space and convert the modified RGB components of the pixel in the linear light space to modified RGB components of the pixel in the non-linear light space.

A non-transitory computer readable medium is provided which has stored instructions for causing a computer to execute a method of shifting a color temperature of an image on a display comprising, for each pixel of the image, converting red, green and blue (RGB) components of the pixel in a non-linear light space to hue, saturation, and value (HSV) components of the pixels in an HSV color space, calculating a color temperature shift for the pixel based on the HSV components of the pixel, converting the RGB components of the pixel in the non-linear light space to RGB components of the pixel in a linear light space, modifying the RGB components of the pixel in the linear light space and converting the modified RGB components of the pixel in the linear light space to modified RGB components of the pixel in the non-linear light space.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
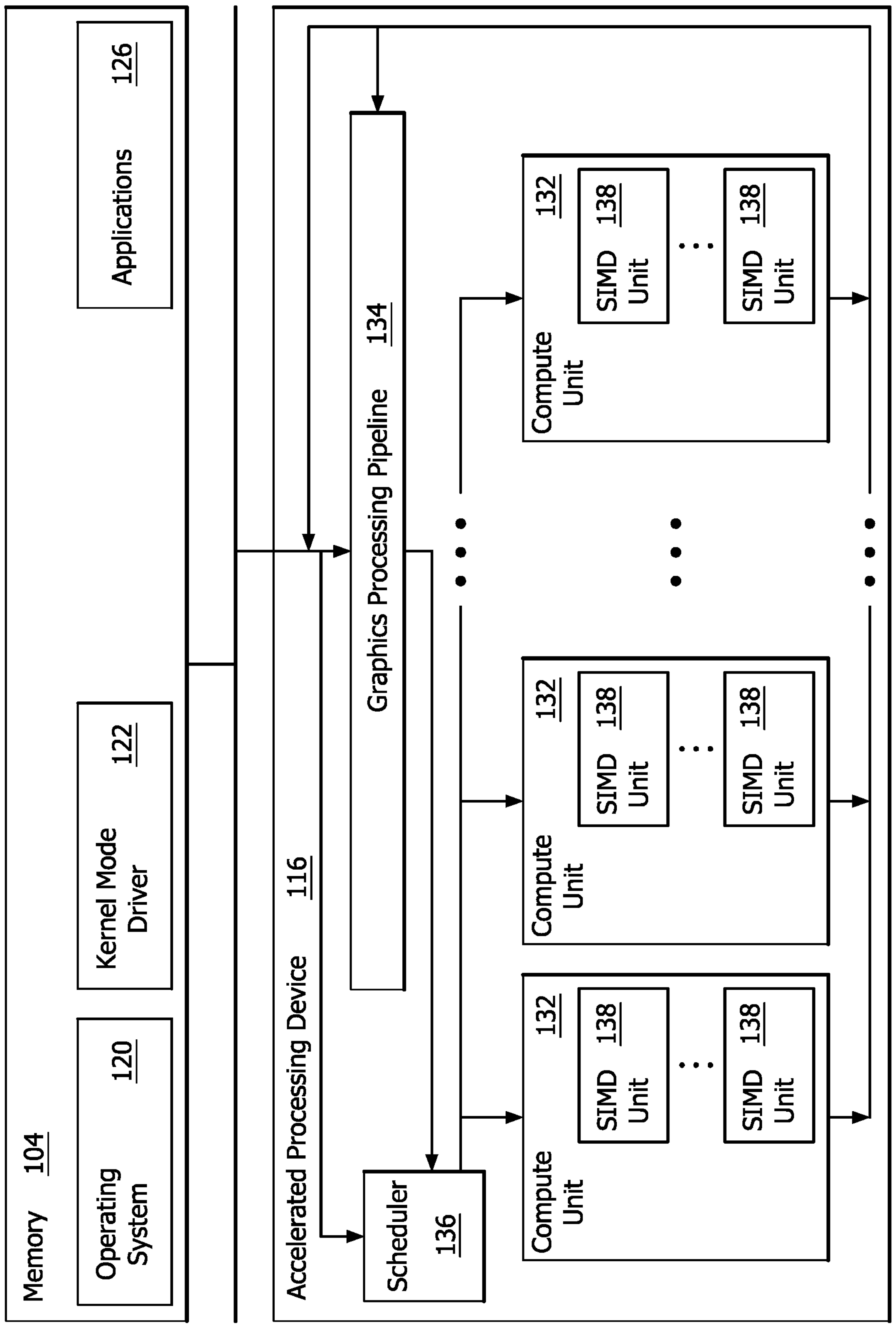
FIG. 2 is a block diagram illustrating exemplary components of a processing device in which one or more features of the disclosure can be implemented.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The APD 116 is configured to execute machine learning models, including deep learning models. The APD 116 is configured to store activation tensor data at different layers of machine learning neural networks. The APD 116 is configured to perform, at each layer, operations (e.g., convolution kernel, pooling operation) to input data (e.g., image, activations tensors) of a previous layer and apply filters to the input data to provide tensor data for the next layer.

Figure 3:
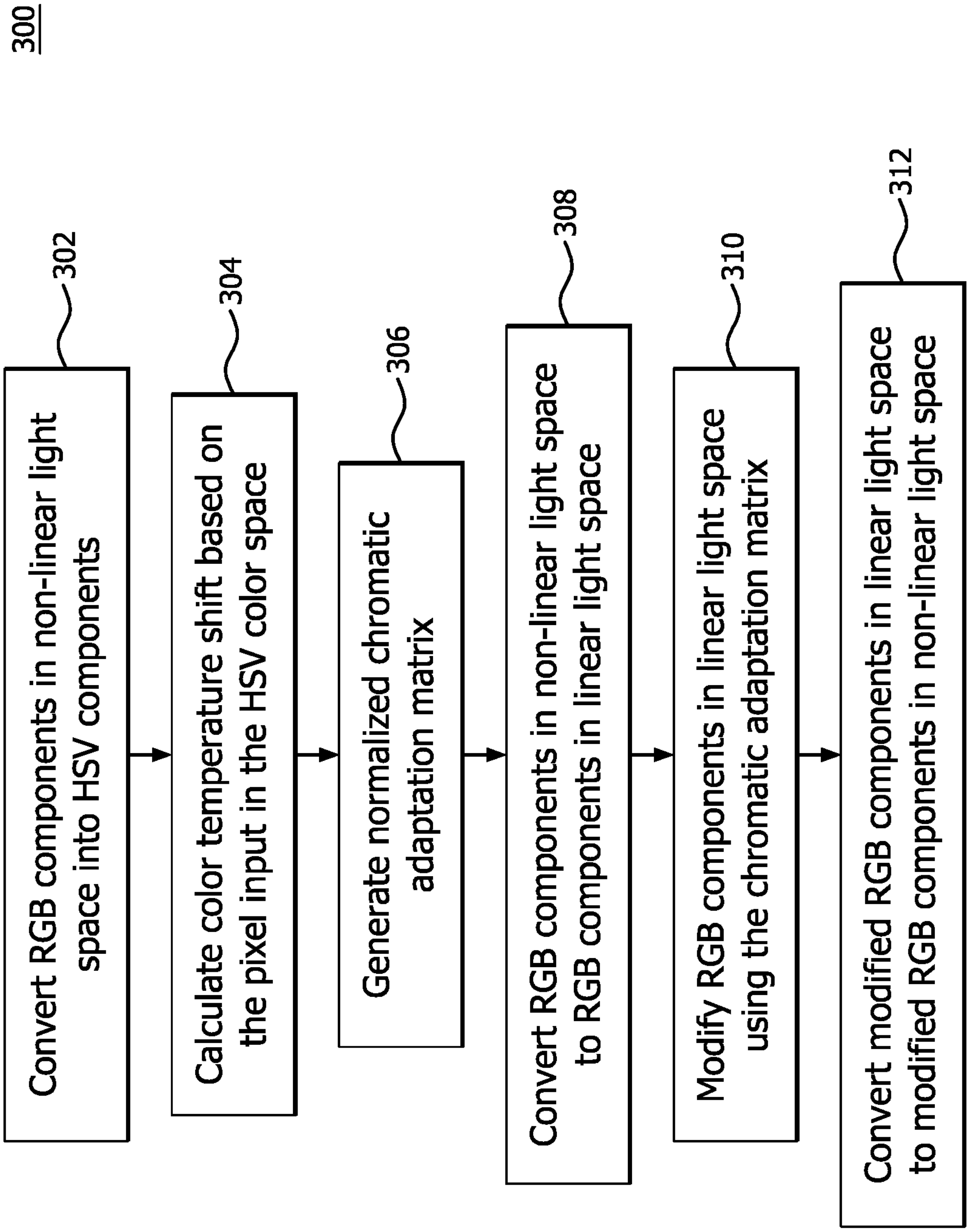
FIG. 3 is a flow diagram illustrating an example method of shifting a color temperature of an image on a display according to features of the present disclosure.
Figure 7:
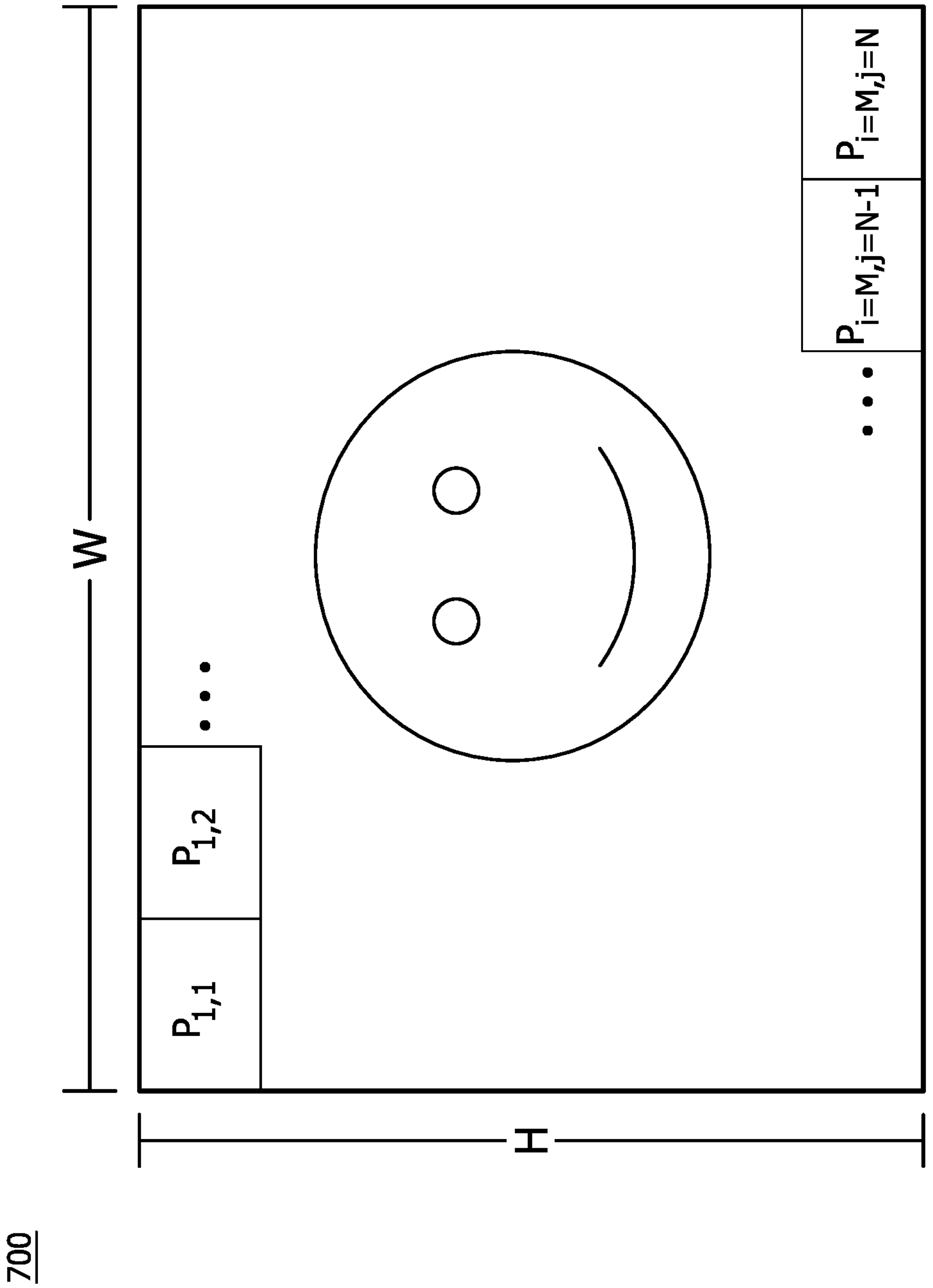
FIG. 7 is an illustration of an example image which can be used to implement to one or more features of the present disclosure.

FIG. 3 is a flow diagram illustrating an example method 300 of shifting a color temperature of an image on a display according to features of the disclosure. The example method 300 reduces the harmful effects of blue light emission by shifting a color temperature of an image on a per pixel basis. That is, a color temperature is shifted for each pixel P of an image, such as the example displayed image 700 shown in FIG. 7, with spatial coordinates (i,j), $i=\overline{1,W}$, $j=\overline{1,H}$, where H is the number of pixel rows (image height) in the example image 700 and W is the number of pixel columns (image width) in the example image 700. For simplification, each of the pixels are not shown in FIG. 7. For simplification, each of the pixels are not shown in FIG. 7. In addition, features of the present disclosure can be implemented for an image having any number of pixels, including ay number or pixel rows and any number of pixel columns.

As shown at block 302 in FIG. 3, the method 300 includes converting R'G'B' components of pixels of the image 700 in a non-linear light space to hue, saturation, and value (HSV) components of the pixels in an HSV color space. That is, for each pixel P with spatial coordinates (i,j), $i=\overline{1,W}$, $j=\overline{1,H}$, H, of the example displayed image 700 shown in FIG. 7, the RGB values R'(i,j), G'(i,j), B'(i,j) of the components in non-linear light space are converted to HSV component values H(i,j),S(i,j), V(i,j) in an HSV color space.

The R'G'B' components in the non-linear light space of a pixel are converted to HSV values, for example, as shown below in Equations 1-4.

$$\text{MAX} = \text{MAX}(R', G', B'),\ \text{MIN} = \text{MIN}(R', G', B') \qquad \text{Equation 1}$$

$$H = \begin{cases} \text{undefined}, & \text{if MAX} = \text{MIN} \\ 60 \times \dfrac{G' - B'}{\text{MAX} - \text{MIN}}, & \text{if MAX} = R \\ 60 \times \dfrac{B' - R'}{\text{MAX} - \text{MIN}} + 120, & \text{if MAX} = G \\ 60 \times \dfrac{R' - G'}{\text{MAX} - \text{MIN}} + 240, & \text{if MAX} = B \end{cases} \qquad \text{Equation 2}$$

$$S = \begin{cases} 0, & \text{if MAX} = 0 \\ \dfrac{\text{MAX} - \text{MIN}}{\text{MAX}}, & \text{otherwise} \end{cases} \qquad \text{Equation 3}$$

$$V = \text{MAX} \qquad \text{Equation 4}$$

where R'G'B' values are in the range [0,1], the HSV values are in the ranges H=[0,360), S=[0,1], and V=[0,1].

As shown at block 304 in FIG. 3, the method 300 includes calculating a color temperature shift $CT_{shift}<0$ for each pixel P.

The color temperature shift is calculated for each pixel based on the HSV component values (converted in block 302) and a target color temperature shift (for white color). The color temperature shift $CT_{shift}$ is denoted below in Equation 5.

$$CT_{shift}(i,j) = \left[CT_{shift}^{white}, 0\right] \quad \text{Equation 5}$$

For each pixel P of the example image 700, the color temperature shift $CT_{shift}$ is calculated as a function of the components of a pixel P and a target color temperature shift $CT_{shift}^{white}<0$ (for white color) as shown below in Equation 6.

$$CT_{shift}(i,j) = F_{shift}\left(R'(i,j), G'(i,j), B'(i,j), CT_{shift}^{white}\right) \quad \text{Equation 6}$$

Figure 4:
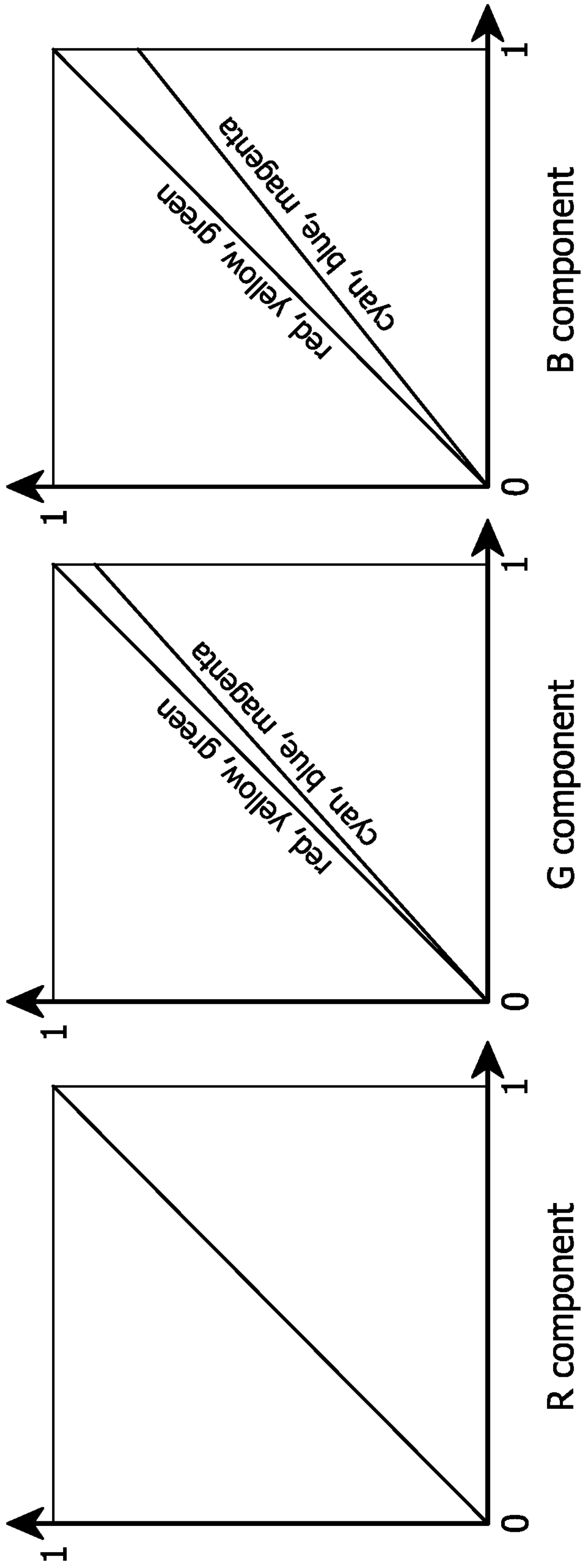
FIG. 4 shows graphical illustrations of transfer functions, for RGB pixel components, used to reduce the blue light of an image according to one or more features of the present disclosure.
Figure 5:
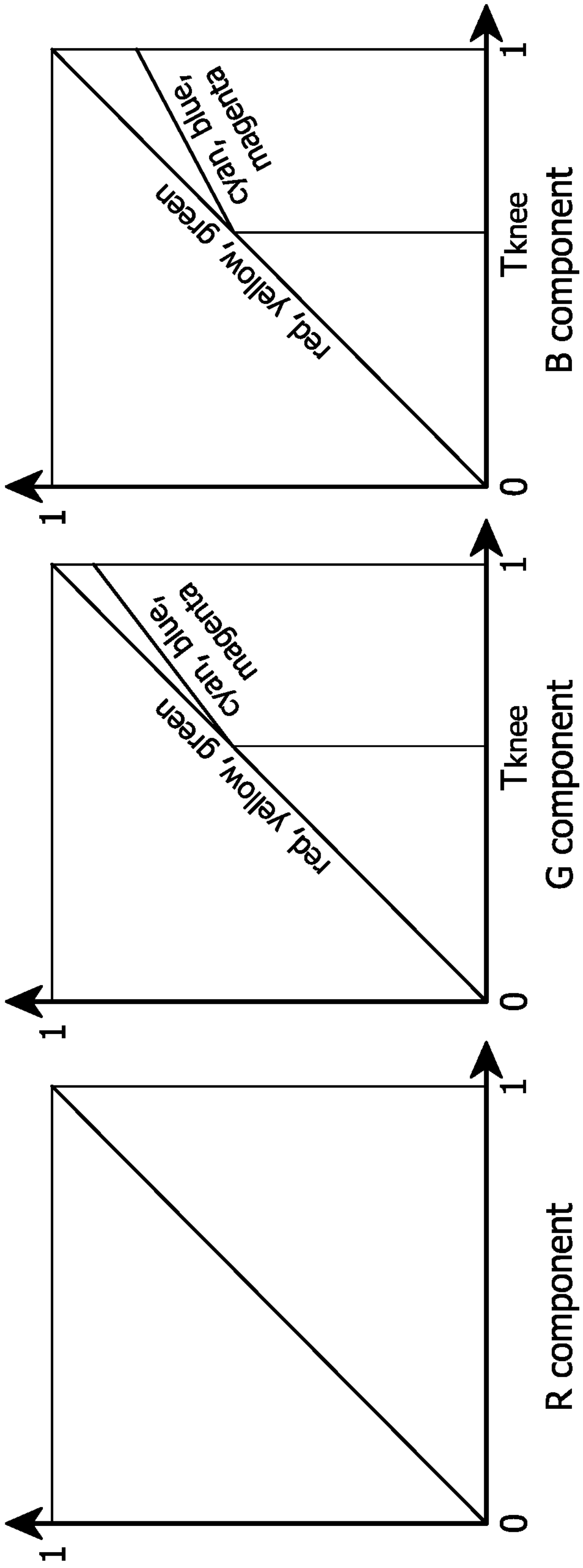
FIG. 5 shows graphical illustrations of transfer functions, for RGB pixel components, used with soft clipping to reduce the blue light of an image according to one or more features of the present disclosure.

FIG. 4 and FIG. 5 are graphical illustrations of transfer functions, for RGB pixel components, used to reduce the blue light of an image according to one or more features of the disclosure. FIG. 4 illustrates pixel component transfer functions used without soft clipping and FIG. 5 illustrates transfer functions used with soft clipping (as described in more detail below). The vertical axes of the graphical illustrations in FIG. 4 and FIG. 5 represent the transformed value of a color component, and the horizontal axes in FIG. 4 and FIG. 5 represent the original value of a corresponding color component (i.e., R component, G component and B component).

As shown in FIG. 4, for pixel colors having a B component value of zero (e.g., red, yellow and green), the transfer functions for each of the RGB components are unity (i.e. no temperature color shift). For pixel colors having a non-zero B component value (e.g., cyan, blue, and magenta), the transfer function for the R component is unity (i.e. no temperature color shift), but the transfer functions for the G component and the B component are not unity and but linear (i.e., temperature color shift for the G component and the B component). Transfer functions for colors with other hues can be obtained by linear interpolation between the two cases described above (i.e., interpolation between no temperature color shift and the temperature color shift for the G component and the B component shown in FIG. 4).

Figure 6:
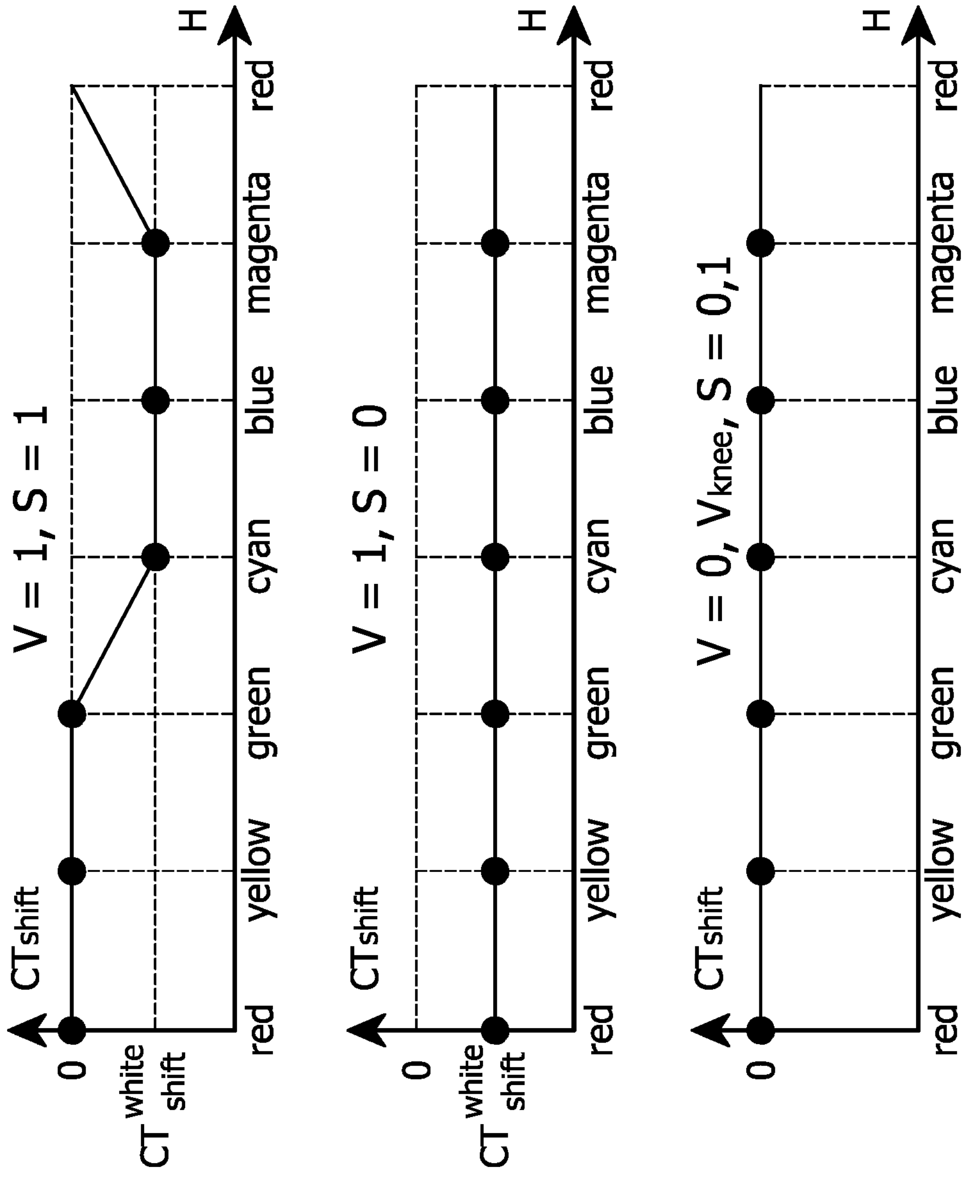
FIG. 6 is a graphical illustration of color temperature shifts for different anchor points using soft clipping according to one or more features of the disclosure.

The blue light of the displayed image can be further reduced by a soft clipping technique with a knee point $T_{knee}=[0,1]$, as shown below in Equation 7.

$$CT_{shift}(i,j) = F_{shift}\left(R'(i,j), G'(i,j), B'(i,j), CT_{shift}^{white}, T_{knee}\right), \quad \text{Equation 7}$$

where the shift function $F_{shift}$ is defined in anchor points as shown in FIG. 6.

FIG. 6 is a graphical illustration of color temperature shifts for different anchor points in the HSV color space using soft clipping according to one or more features of the disclosure.

The color temperature shift of each pixel is further calculated based a knee point threshold value $T_{knee}$. The knee point threshold value $T_{knee}$ is, for example, a value in a range (0, 1) with default value 0.5. $T_{knee}=0$ means no knee point. $T_{knee}=1$ means no color shift. That is, the color temperature of a pixel with a non-zero blue component value is shifted (reduced) when green or blue component value of the pixel is greater than a knee point threshold $T_{knee}$.

FIG. 5 is a diagram showing a graphical illustration of transfer functions, for RGB pixel components, used with soft clipping to reduce the blue light of an image according to one or more features of the disclosure. For $T_{knee}=0$ (i.e., the transfer functions with no soft clipping shown in FIG. 4), the transfer functions are linear and not unity (i.e., color shift). For $T_{knee}=1$, the transfer functions are linear but unity (i.e., no color temperature shift).

As shown in FIG. 5, each of the three transfer functions are unity for colors with a B component value of zero (red, yellow, green). For colors with a non-zero blue component value (cyan, blue, and magenta), the transfer function for the R component is unity and the functions for the G component and the B component are unity before knee point $T_{knee}$ and not unity after the knee point $T_{knee}$. Transfer functions for colors with the other hues may be obtained by interpolation between these two cases.

As shown at block 306 in FIG. 3, the method 300 includes generating a normalized chromatic adaptation 3×3 matrix $M_{CA}$ according to a chromatic adaptation algorithm based on chromaticity coordinates (e.g., CIE 1931 chromaticity coordinates) of the red, green, blue, and white colors of the display (e.g., display device 118) and the calculated color temperature shift $CT_{shift}$ (calculated at block 304). The generated matrix $M_{CA}$ is shown below in Equations 8 and 9. Generate normalized chromatic adaptation 3×3 matrix $M_{CA}$ (i,j) by chromatic adaptation algorithm based on chromaticity coordinates (e.g., CIE 1931 chromaticity coordinates) $(x_R, y_R)$, $(x_G, y_G)$, $(x_B, y_B)$, $(x_W, y_W)$ of a display's RGB and white colors and calculated color temperature shift $CT_{shift}$ (i,j) for the pixel:

$$M_{CA}(i,j) = \begin{bmatrix} M_{0,0}(i,j) & M_{0,1}(i,j) & M_{0,2}(i,j) \\ M_{1,0}(i,j) & M_{1,1}(i,j) & M_{1,2}(i,j) \\ M_{2,0}(i,j) & M_{2,1}(i,j) & M_{2,2}(i,j) \end{bmatrix} = \quad \text{Equation 8}$$

$$F_{CA}((x_R, y_R), (x_G, y_G), (x_B, y_B), (x_W, y_W), CT_{shift}(i,j)), \text{ where}$$

$$\sum\nolimits_{n=0}^{2} M_{2,n}(i,j) < \sum\nolimits_{n=0}^{2} M_{1,n}(i,j) < \sum\nolimits_{n=0}^{2} M_{0,n}(i,j) = 1 \quad \text{Equation 9}$$

Elements of the chromatic adaptation matrix are weights to be applied to original color components of a pixel to calculate modified components. That is. $M_{0,0}$(i,j), $M_{0,1}$(i,j), $M_{0,2}$(i,j) are weights of original R(i,j), G(i,j), and B(i,j) components to be summed to obtain modified R(i,j) component. $M_{1,0}$(i,j), $M_{1,1}$(i,j), $M_{1,2}$(i,j) are weights of original R(i,j), G(i,j), and B(i,j) components to be summed to obtain modified G(i,j) component. $M_{2,0}$(i,j), $M_{2,1}$(i,j), $M_{2,2}$(i,j) are weights of original R(i,j), G(i,j), and B(i,j) components to be summed to obtain modified B(i,j) component for a pixel P(i,j), $i=\overline{1,W}$, $j=\overline{1,H}$, H, where W is image width (number of pixel columns) and H is image height (number of pixel rows).

Function $F_{CA}((x_R, y_R), (x_G, y_G), (x_B, y_B), (x_W, y_W), CT_{shift}(i,j))$ calculates chromatic adaptation matrix $M_{CA}$(i,j) from CIE 1931 chromaticity coordinates $(x_R, y_R)$, $(x_G, y_G)$, $(x_B, y_B)$, $(x_W, y_W)$ of a display's red, green, blue, and white colors and color temperature shift $CT_{shift}$(i,j) for a pixel P(i,j), $i=\overline{1,W}$, $j=\overline{1,H}$.

CIE 1931 x,y chromaticity coordinates are derived from CIE 1931 X,Y,Z coordinates: x=X/(X+Y+Z), y=y/(X+Y+Z).

CIE 1931 X,Y,Z values are calculated from the spectral power distribution of the light source and the CIE color-matching functions.

As shown at block 308 in FIG. 3, the method 300 includes converting the RGB components of each pixel P in the non-linear light space to RGB components in a linear light space. For example, the R'(i,j), G'(i,j), B'(i,j) values of each pixel P in the example image 700 in non-linear light space are converted to values R(i,j), G(i,j), B(i,j) in linear light space.

As shown at block 310 in FIG. 3, the method 300 includes modifying the input RGB components in the linear light space according to the chromatic adaptation 3×3 matrix $M_{CA}$.

For example, R(i,j), G(i,j), B(i,j) pixel's components in the linear light space are modified by the generated chromatic adaptation matrix $M_{CA}$(i,j) as shown below in P 10.

$$R(i, j) = M_{0,0}(i, j)\times R(i, j) + M_{0,1}(i, j)\times G(i, j) + M_{0,2}(i, j)\times B(i, j),$$
$$G(i, j) = M_{1,0}(i, j)\times R(i, j) + M_{1,1}(i, j)\times G(i, j) + M_{1,2}(i, j)\times B(i, j),$$
$$B(i, j) = M_{2,0}(i, j)\times R(i, j) + M_{2,1}(i, j)\times G(i, j) + M_{2,2}(i, j)\times B(i, j).$$
Equation 10

As shown at block 312 in FIG. 3, the method 300 includes converting the modified RGB components in the linear light space into modified RGB components in non-linear light space. It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of shifting a color temperature of an image on a display, the method comprising:
- for each pixel of the image:
  - converting red, green and blue (RGB) components of the pixel in a non-linear light space to hue, saturation, and value (HSV) components of the pixels in an HSV color space;
  - calculating a color temperature shift for the pixel by applying a color temperature shift function to the HSV components of the pixel;
  - converting the RGB components of the pixel in the non-linear light space to RGB components of the pixel in a linear light space;
  - modifying the RGB components of the pixel in the linear light space based on the color temperature shift; and
  - converting the modified RGB components of the pixel in the linear light space to modified RGB components of the pixel in the non-linear light space.

2. The method of claim 1, wherein the color temperature shift function is based on a knee point threshold value.

3. The method of claim 1, wherein the color temperature shift function is based on a set of HSV anchor points.

4. The method of claim 3, further comprising modifying the RGB components of the pixel in the non-linear light space from the set of the HSV anchor points by at least one of tri-linear or tetrahedra interpolation.

5. The method of claim 1, further comprising modifying the RGB components in the linear light space using a normalized chromatic adaptation matrix.

6. The method of claim 5, further comprising generating a normalized chromatic adaptation based on chromaticity coordinates of the RGB components of the display and the calculated color temperature shift.

7. The method of claim 5, wherein the normalized chromatic adaptation matrix is a matrix of 3 rows and 3 columns of elements that define weights of pre-modified color components of a pixel for calculating modified color components.

8. The method of claim 1, wherein the color temperature shift function is based on a target color temperature shift of white color.

9. A processing device for shifting a color temperature of an image to be displayed, the processing device comprising:
- memory configured to store data; and
- one or more processors that are communicatively coupled to the memory, wherein the one or more processors are collectively configured to:
- for each pixel of the image:
  - convert red, green and blue (RGB) components of the pixel in a non-linear light space to hue, saturation, and value (HSV) components of the pixels in an HSV color space;
  - calculate a color temperature shift for the pixel by applying a color temperature shift function to the HSV components of the pixel;
  - convert the RGB components of the pixel in the non-linear light space to RGB components of the pixel in a linear light space;
  - modify the RGB components of the pixel in the linear light space based on the color temperature shift; and
  - convert the modified RGB components of the pixel in the linear light space to modified RGB components of the pixel in the non-linear light space.

10. The processing device of claim 9, further comprising a display device, wherein the RGB components of the pixel in the non-linear light space are displayed at the display device.

11. The processing device of claim 9, wherein the color-temperature shift function is based on a knee point threshold value.

12. The processing device of claim 11, wherein the knee point threshold value is equal to 0.

13. The processing device of claim 9, wherein the color temperature shift function is based on a set of HSV anchor points.

14. The processing device of claim 13, wherein the one or more processors are further collectively configured to:

modify the RGB components of the pixel in the non-linear light space from the set of the HSV anchor points by at least one of tri-linear or tetrahedra interpolation.

15. The processing device of claim 9, wherein the one or more processors are further collectively configured to:

modify the RGB components in the linear light space using a normalized chromatic adaptation matrix.

16. The processing device of claim 15, wherein the one or more processors are further collectively configured to:

generate the normalized chromatic adaptation matrix based on chromaticity coordinates of the RGB components and the calculated color temperature shift.

17. The processing device of claim 15, wherein the normalized chromatic adaptation matrix is a matrix of 3 rows and 3 columns of elements that define weights of pre-modified color components of a pixel for calculating modified color components.

18. The processing device of claim 9, wherein the one or more processors are further collectively configured to, for each pixel of the image, calculate the color temperature shift as a function of the components of a corresponding pixel and a target color temperature shift of white color.

19. A non-transitory computer readable medium storing instructions for shifting a color temperature of an image on a display, the instructions when executed by one or more processors cause the one or more processors to execute a method comprising:

for each pixel of the image:

converting red, green and blue (RGB) components of the pixel in a non-linear light space to hue, saturation, and value (HSV) components of the pixels in an HSV color space;

calculating a color temperature shift for the pixel by applying a color temperature shift function to the HSV components of the pixel;

converting the RGB components of the pixel in the non-linear light space to RGB components of the pixel in a linear light space;

modifying the RGB components of the pixel in the linear light space based on the color temperature shift; and converting the modified RGB components of the pixel in the linear light space to modified RGB components of the pixel in the non-linear light space.

20. The non-transitory computer readable medium of claim 19, wherein the color temperature shift function is based on a knee point threshold value.

* * * * *